(12) United States Patent
Rockwell et al.

(10) Patent No.: US 7,201,127 B2
(45) Date of Patent: Apr. 10, 2007

(54) INTERNAL COMBUSTION ENGINE START-UP OPERATING MODE AND ENGINE USING SAME

(75) Inventors: Andrew D. Rockwell, East Peoria, IL (US); Travis E. Barnes, Matamora, IL (US); Evan E. Jacobson, Peoria, IL (US); David J. Schuh, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/181,670

(22) Filed: Jul. 14, 2005

(65) Prior Publication Data

US 2007/0012283 A1    Jan. 18, 2007

(51) Int. Cl.
*F02D 41/06* (2006.01)
*F02N 17/00* (2006.01)
*F02B 3/00* (2006.01)
*G06F 19/00* (2006.01)

(52) U.S. Cl. .................. 123/179.16; 123/299; 701/113

(58) Field of Classification Search ................ 123/295, 123/299, 300, 304, 305, 431, 179.15, 179.16, 123/491; 701/104, 105, 113
See application file for complete search history.

(56) References Cited

U.S. PATENT DOCUMENTS

| | | | |
|---|---|---|---|
| 3,812,830 A | 5/1974 | Traisnel | |
| 3,923,031 A | 12/1975 | Keranen | |
| 4,069,795 A | 1/1978 | Long et al. | |
| 4,724,816 A | 2/1988 | Kanno et al. | |
| 5,231,962 A | 8/1993 | Osuka et al. | |
| 5,865,153 A | 2/1999 | Matsumoto | |
| 5,890,467 A | 4/1999 | Romzek | |
| 5,954,030 A | 9/1999 | Sturman et al. | |
| 6,032,642 A | 3/2000 | Trumbower et al. | |
| 6,088,647 A | 7/2000 | Hemberger et al. | |
| 6,182,632 B1 | 2/2001 | Yanagihara | |
| 6,305,348 B1 | 10/2001 | Grosmougin et al. | |
| 6,378,487 B1 * | 4/2002 | Zukouski et al. | 123/299 |
| 6,470,849 B1 | 10/2002 | Duffy et al. | |
| 6,666,020 B2 * | 12/2003 | Tonetti et al. | 123/299 |
| 6,789,512 B2 | 9/2004 | Duvinage et al. | |
| 6,986,331 B2 * | 1/2006 | Mizutani | 123/179.15 |

FOREIGN PATENT DOCUMENTS

| | | |
|---|---|---|
| EP | 0 534 491 | 3/1993 |
| FR | 2 854 925 | 11/2004 |
| JP | H6-129296 | 5/1994 |
| JP | 06129298 A | 10/1994 |
| JP | 2000-97077 | 4/2000 |
| JP | 2005157024 A * | 6/2005 |

* cited by examiner

*Primary Examiner*—Willis R. Wolfe, Jr.
(74) *Attorney, Agent, or Firm*—Liell & McNeil (57) ABSTRACT

A method of initially operating an internal combustion engine including operating the engine in a start-up mode is provided. The start-up mode includes injecting at least two fuel pre-shots wherein a first of the fuel pre-shots is smaller in quantity than a last of the fuel pre-shots. An engine is provided including an electronic controller with a computer readable medium having a control algorithm recorded thereon, the control algorithm including means for commanding injection of a main fuel shot and at least two fuel pre-shots wherein a first of the fuel pre-shots is smaller in quantity than a last of the fuel pre-shots.

20 Claims, 4 Drawing Sheets

Figure 4

INTERNAL COMBUSTION ENGINE START-UP OPERATING MODE AND ENGINE USING SAME

TECHNICAL FIELD

The present disclosure relates generally to internal combustion engines and initial operating methods therefor, and relates more particularly to a start-up mode that includes injecting a main fuel shot and at least two fuel pre-shots, a first of the pre-shots being smaller in quantity than a last of the pre-shots.

BACKGROUND

Internal combustion engines are well known and widely used throughout the world. Virtually all modern work machines, and many power generation systems depend upon internal combustion engines as either a primary power source, or indirectly to provide electricity for operation. Over the many decades of internal combustion engine development, engineers have devised means for operating such engines in virtually every conceivable environment. While sophisticated control and operating systems allow most modern internal combustion engines to operate under extremes of temperature, inherent sensitivities within the engine hardware can still place limitations on operation, particularly with respect to initiating operation under cold conditions.

In certain fuel injected internal combustion engines, inherent difficulty in accurately controlling the quantities of fuel injected in very small injection events can actually make cold starting easier. In some systems, an inherent uncertain sluggishness exists in admission valve opening and closing during a cold start. As a result, fuel may begin injecting relatively more slowly than actually commanded by the control system. Under cold starting conditions, the initially sluggish start of injection can actually make cold starting easier, as the slower initial rate of injection of cold fuel actually tends to facilitate ignition once autoignition conditions are reached in the cylinder. In certain other systems, for example, some high pressure common rail designs, the start of injection tends to be quite abrupt. By removing the inherent sluggishness in fuel injection, engineers have in some cases made engines more difficult to cold start.

One operating approach that addresses cold starting concerns in a common rail design includes the use of relatively small, closely timed pre-jets of fuel injected in an engine cycle prior to a main injection. The pre-jets can induce an activated condition in an engine cylinder that facilitates ignition of a main shot in situations where main shot ignition would otherwise be difficult or impossible. One challenge to such an approach, however, relates to the tendency for injection of overly large pre-jets to absorb too much heat from the cylinder charge air. In other words, heat absorption by the relatively cold fuel of the pre-jets appears to reduce the temperature of the charge air to a point where ignition of the main injection is undermined. Thus, rather than facilitating cold starts, the use of pre-jets can inhibit, or at least fail to improve, ignition of the main fuel injection, in certain instances.

U.S. Pat. No. 5,231,962 to Osuka et al. is directed to one method and control system for enhancing diesel engine starting ability under certain conditions. Osuka et al. utilize one or more pre-jets of fuel injected prior to a main jet of fuel during an engine cycle. The pre-jet is stated to develop an easily ignitable, activated condition in the cylinder conducive to ignition of the main jet of fuel. While Osuka et al. appear to recognize one approach to addressing starting problems in diesel engines, there is always room for improvement.

The present disclosure is directed to one or more of the problems or shortcomings set forth above.

SUMMARY OF THE INVENTION

In one aspect, the present disclosure provides a method of initially operating an internal combustion engine. The method includes the step of initiating operation of the internal combustion engine, including operating the engine in a start-up mode that includes injecting a main shot and at least two fuel pre-shots into at least one cylinder of the engine during an engine cycle, wherein a first pre-shot is smaller in quantity than a last pre-shot. The method further includes the step of, concluding operation in the start-up mode.

In another aspect, the present disclosure provides an internal combustion engine. The internal combustion engine includes a housing defining at least one cylinder, and a fuel injector disposed at least partially within the at least one cylinder. An electronic controller is provided, and is in control communication with the fuel injector. The electronic controller includes a computer readable medium having a control algorithm recorded thereon which includes means for operating the engine in a start-up mode. The means for operating includes means for commanding injection of a main shot and at least two fuel pre-shots during an engine cycle including a first fuel pre-shot and a last fuel pre-shot larger in quantity than the first fuel pre-shot.

In still another aspect, the present disclosure provides an article including a computer readable medium having an internal combustion engine start-up control algorithm recorded thereon. The control algorithm includes means for commanding injection of a main shot and at least two fuel pre-shots in an engine cycle including a first pre-shot and a last pre-shot larger in quantity than the first pre-shot. The control algorithm further includes means for varying at least one of, a number and average quantity of the fuel pre-shots in at least one subsequent engine cycle according to a determined engine temperature and a determined engine speed.

DETAILED DESCRIPTION

Figure 1:
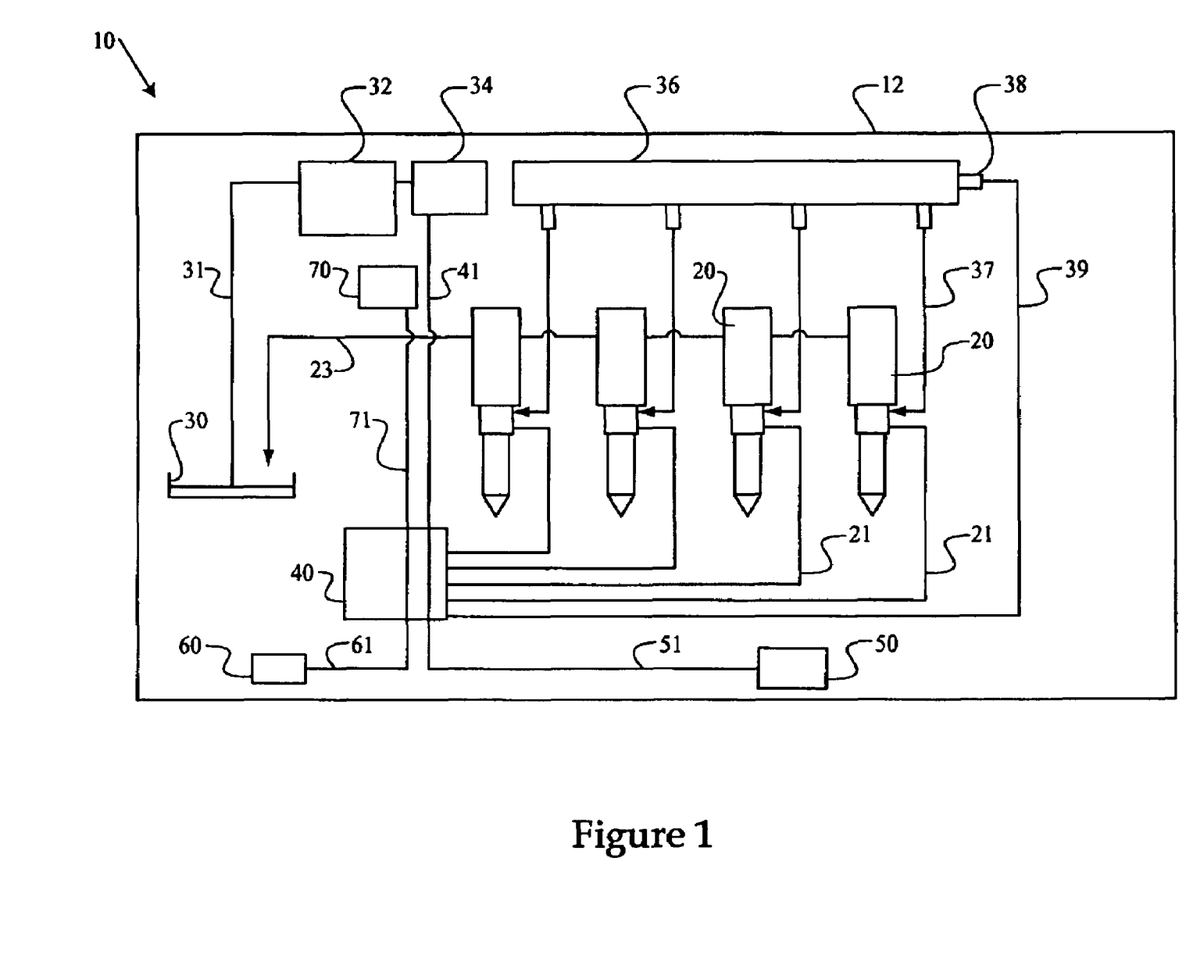
FIG. 1 is a diagrammatic illustration of an internal combustion engine according to the present disclosure.

Referring to FIG. 1, there is shown an engine 10 according to one embodiment of the present disclosure. Engine 10 includes an engine housing including at least one cylinder having a fuel injector 20 disposed at least partially therein. In the embodiment pictured in FIG. 1, engine 10 includes a plurality of fuel injectors each associated with an engine cylinder (not shown). Engine 10 may further include a common rail 36 for supplying pressurized fuel to each of the fuel injectors 20. A fuel tank 30 may provide a supply of fuel to common rail 36 via a supply passage 31, a low pressure pump 32 and a high pressure pump 34. Additional supply passages 37 may be provided for supplying pressurized fuel from common rail 36 to each of the individual fuel injectors 20. Pressurized fuel supplied to each injector may be injected by activating an electrically actuated admission valve of each injector (not shown) in a conventional manner. Alternatively, the injectors could remain pressurized, and injection initiated by relieving pressure on a closing hydraulic surface of a direct control needle valve. Each of injectors 20 may be serially connected with a drain passage to return un-injected fuel to fuel tank 30 via a drain passage 23.

While it is contemplated that a common rail design will represent one practical implementation strategy, engine 10 is by no means limited to such a design, and might alternatively utilize one or more unit injectors coupled with unit pumps for supplying pressurized fuel thereto. Moreover, while common rail 36 will typically provide pressurized fuel to each of injectors 20, alternative designs are contemplated wherein another suitable fluid is used to actuated each of injectors 20, and fuel is supplied thereto by another suitable means. For example, engine 10 might utilize a common rail that supplies pressurized engine oil, transmission or coolant fluid to each injector to actuate a fuel pressurization piston for injecting fuel supplied to each injector by some means other than a common rail. It is further contemplated that engine 10 may be a compression ignition diesel engine, however, other engine designs and engine types may fall within the scope of the present disclosure.

Engine 10 may further include an electronic controller 40 in control communication with each of injectors 20 via a communication line 21 and operable to activate and/or deactivate the electrical actuator thereof to control the timing of start of injection and end of injection at each respective injector 20. Electronic controller 40 may also be operable to control and/or maintain a pressure of fuel in common rail 36. To this end, electronic controller 40 may be coupled with a common rail pressure sensor 39 which is in turn operable to sense a pressure of the fluid in common rail 36. Electronic controller 40 may control a speed and/or displacement of high pressure pump 34 via a communication line 41 to set or adjust the fuel pressure in common rail 36 as desired, in a conventional manner.

Electronic controller 40 may further be operable to determine an engine speed via a speed sensor 60 coupled therewith via a communication line 61. Speed sensor 60 may be, for example, a crankshaft speed sensor. Electronic controller 40 may still further be operable to determine an engine temperature, for instance, an engine coolant temperature via a temperature sensor 50 coupled with electronic controller 40 via another communication line 51. Those skilled in the art will appreciate that a wide variety of other known means exist for directly or indirectly determining engine speed and engine temperature, and the present disclosure is not thereby limited to the methods described herein.

The present disclosure may further provide a method of operating engine 10, which may be a method of initially operating engine 10. The method may include the step of initiating operation of engine 10, wherein the step of initiating includes operating engine 10 in a start-up mode that includes injecting a main fuel shot and at least two fuel pre-shots into at least one cylinder of engine 10 during an engine cycle, for example an initial engine cycle. The "main" fuel shot may be a governed main fuel shot, having a quantity determined by subtracting a total pre-shot fueling quantity from a crank fueling limit mapped, for example, to engine speed, temperature and intake manifold pressure in a conventional manner.

Injecting the at least two fuel pre-shots may further include injecting a first pre-shot that is smaller in quantity than a last pre-shot. The method may further include concluding operation in the start-up mode, for instance once it is determined that engine 10 has reached an idle condition or another state where operation is considered to be sufficiently stable. It should therefore be appreciated that "idle condition" may be a subjective state that can be varied as desired by an operator, or it may be a predetermined state corresponding, for example, to a particular engine speed and/or engine temperature. Further, while it is contemplated that the method of the present disclosure will typically be applied in the initial engine cycle upon start-up, the present disclosure is not thereby limited. For example, a different control methodology might be used initially, with the present method only beginning after one or more initial engine cycles. Similarly, engine 10 might be subjected to various initial system checks to determine whether start-up via the method of the present disclosure is appropriate prior to even attempting initial operation. Further still, rather than serving as a default initial operating approach, start-up via the method of the present disclosure might be selected by an operator or electronic controller 40 only after some other initial operating method is attempted.

The respective fuel quantities of the at least two fuel pre-shots may vary based on a determined engine temperature. The total pre-shot fueling will typically be relatively larger where determined engine temperature is relatively lower, as it is well known in the art that relatively cold engine starting conditions may require relatively large quantities of fuel, as compared to relatively warmer engine starting conditions.

For example, relatively larger fuel pre-shots may be used where engine temperature is relatively lower, or at least the last of the fuel pre-shots may be relatively larger where starting engine temperature is relatively lower, as described herein. The present description should not be understood, however, to mean that the actual quantity of each individual fuel pre-shot must be larger for colder conditions, although such might be the case in certain embodiments.

The total pre-shot fueling and thus respective fuel quantities may likewise vary based on determined engine speed. Thus, a multi-dimensional map such as a look-up table, neural network or the like might be used for pre-shot fueling, including an engine speed coordinate and an engine temperature coordinate, for example. At relatively slower speeds, relatively larger fuel pre-shots may be used, or at least relatively larger total pre-shot fueling quantities. As the engine speeds up and warms, the relative size of the fuel pre-shots may be reduced, as described herein.

The total number of fuel pre-shots may also vary based on determined engine temperature and determined engine speed, for example having a multi-dimensional map including temperature and speed coordinates. In particular, where engine speed and temperature is relatively low, at least three fuel pre-shots may be utilized, also characterized by a first of the fuel pre-shots being smaller than a last of the fuel pre-shots. Where the determined engine temperature and determined engine speed remain below predetermined thresholds during plural engine cycles, at least three fuel pre-shots may continue to be injected until the respective thresholds are reached. In other words, for relatively cold conditions and relatively slower engine speeds, a relatively greater number of fuel pre-shots may be injected per each engine cycle until engine 10 warms and speeds up to a point where two fuel pre-shots are appropriate.

Operation may continue with two fuel pre-shots injected in each engine cycle until relatively higher thresholds are reached for each of engine temperature and speed. Once the higher respective thresholds are reached, only a single pre-shot may be injected in each engine cycle, and eventually none when the engine has sufficiently warmed and increased in speed. As described herein, electronic controller 40 may determine an appropriate number of fuel pre-shots on a cycle by cycle basis, accessing a pre-shot map just prior to each engine cycle to determine an appropriate number of fuel pre-shots. The determination of total pre-shot fueling may take place generally in parallel with the shot count determination, such that number and total quantity are determined each engine cycle in an open-loop fashion. An approach for determining the specific sizing of individual pre-shots is also set forth herein.

The timing of the individual fuel pre-shots may also vary based on different operating conditions. To this end, the method of the present disclosure may further include determining an intake manifold pressure or IMAP, and determining a time between the pre-shots based at least in part on determined IMAP, engine speed and engine temperature. Those skilled in the art will appreciate that the time between the individual pre-shots represents an electronic dwell time between logic pulses from electronic controller 40 to each injector 20, the logic pulses corresponding to fuel pre-shots and a main shot. Thus, electronic dwell times may be mapped to IMAP, engine speed and engine temperature. It has been discovered that where ambient pressures are relatively lower, such as at higher altitudes, the available window of time for injecting the pre-shots as well as the main shot may be relatively narrower, as the time where autoignition conditions exist in the cylinder may be relatively lesser with lower ambient pressures. Accordingly, where IMAP is relatively lower, the fuel pre-shots might be relatively more closely spaced together.

In addition to determining the relative temporal spacing of the fuel pre-shots, the present disclosure provides a means for determining a timing of injection of a first of the fuel pre-shots. To achieve this end, electronic controller 40 may utilize a main timing map, wherein a total fueling (pre-shot fueling plus main fueling), engine speed and coolant temperature each serve as map coordinates for determining a timing of the first shot, which may correspond to a predetermine crank angle of engine 10. In general terms, the timing of the first shot might tend to be relatively earlier with colder engine temperatures, at least with other parameters being equal.

If desired, once engine 10 reaches an operating state where no pre-shots are required, the start-up control logic may be deactivated. Alternatively, the same control logic may continue to control engine operation until such time as an operator or electronic controller 40 determines it is otherwise appropriate to switch over to a conventional control logic. Thus, it should be understood that while the present disclosure is contemplated to be applicable to initial engine operation, the range of operating conditions to which the presently described method is well suited may vary from one application to another.

The present disclosure further provides a means for determining the individual quantities of each fuel pre-shot via a fuel pre-shot quantity slope. The fuel pre-shot slope allows the quantity of each of the fuel pre-shots to be determined without a need for individual maps for each of the fuel pre-shots. In other words, rather than mapping the quantity of each individual fuel pre-shot to such parameters as engine speed and engine temperature, a pre-shot slope may be applied to set or adjust individual pre-shot fuel quantities. As described herein, electronic controller 40 may reference a pre-shot slope map wherein the pre-shot slope is mapped to engine temperature and engine speed. It should be appreciated, however, that the present disclosure is not limited to the use of a pre-shot slope, and if desired the individual pre-shot quantities could be mapped separately to engine speed and engine temperature, for example.

Once fuel pre-shot number and total fuel quantity is determined, the fuel pre-shot quantity slope may be applied to determine the size of each individual fuel pre-shot. For instance, where it is determined that three fuel pre-shots having a total quantity of X mm$^3$ is appropriate, the pre-shot slope may be applied to truncate the size of the first fuel pre-shot, and expand the size of the last fuel pre-shot. In other words, the quantity of the first fuel pre-shot may be offset by a certain degree dictated by the fuel pre-shot slope. The quantity of the second fuel pre-shot may be simply the mapped quantity without a slope offset. The quantity of the third fuel pre-shot may be offset by the same degree as the first fuel pre-shot, but in an increasing quantity direction. Where three fuel pre-shots are used, the fuel pre-shot quantity slope may thus be used to determine a fuel quantity amount to be subtracted from the first fuel pre-shot. The fuel pre-shot quantity slope may then be used to determine that an equal quantity is to be added to the last pre-shot as that subtracted from the first pre-shot.

The fuel pre-shot quantity slope may therefore be a linear slope for simplicity, but need not be, and the fuel pre-shots may successively increase in quantity. Where only two fuel pre-shots are used, the fuel pre-shot quantity slope may be used to adjust the quantities of the two pre-shots in a similar fashion, offsetting the first pre-shot by an amount equal but opposite to an offset made to the last fuel pre-shot. The pre-shot slope may also be a non linear curve in more complex versions of this disclosure.

In general, where determined engine temperature and/or determined engine speed are relatively lower, a relatively steeper fuel pre-shot slope may be appropriate. In other words, at relatively lower engine temperatures and engine speeds, the difference in relatively quantity between the first and the last fuel pre-shot may be relatively larger. As the engine warms and speeds up, the determined fuel pre-shot slope map may apply a relatively less steep slope, eventually flattening toward a zero slope toward the end of initial operations. The number of fuel pre-shots and their absolute quantities may also be reduced as the engine warms and speeds up, as determined by the respective shot count and pre-shot fueling maps.

It should be appreciated that the present disclosure may be implemented in systems where hardware limitations will not consistently allow a fuel pre-shot below a certain quantity. In other words, the capability of fuel injectors 20 to reliably and consistently deliver pre-shots (or any fuel injection for that matter) below a certain quantity may be limited, because, among other things, there may be inherent limitations on how quickly an admission valve may be opened and closed with consistently controllable results. Where such a situation arises, for instance, where extremely cold temperatures would otherwise call for a fuel pre-shot that is below that which the injector can provide, a predetermined minimum quantity fuel pre-shot may be injected, corresponding to the minimum possible fuel pre-shot quantity. These minimum controllable quantities might also be stored versus temperature for use by the electronic controller.

In addition to the determinations described herein respecting the quantity and number of each of the fuel pre-shots, the start of injection pressure "SOI P" as provided by common rail 36 may be varied responsive to certain engine start-up conditions. In general terms, where engine temperature is relatively lower, the SOI P will ideally be relatively lower. It has been discovered that relatively lower SOI P will tend to reduce the likelihood of quenching as the fuel pre-shots are injected. Accordingly, electronic controller 40 may control high pressure pump 34, for example, to maintain or adjust the fuel pressure in common rail 36 toward a desired SOI P. As engine 10 warms and speeds up, the SOI P will generally be increased. SOI P may be mapped, for example, to engine speed, total fueling (pre-shots plus main shot) and engine temperature, for example. Electronic controller 40 may further utilize a start of injection pressure multiplier, for example corresponding to IMAP and engine temperature, to adjust the mapped SOI P toward an ideal level as described herein.

Electronic controller 40 may include a computer readable medium such as RAM, ROM or another suitable medium that includes a control algorithm recorded thereon. The control algorithm may include an engine start-up control algorithm having means for operating engine 10 in a start-up mode. In one contemplated embodiment, the respective start-up control logic will be activated upon initiating operation of engine 10, for example, by closing an ignition control circuit with an engine key in a conventional manner. The means for operating engine 10 in the start-up mode may further include means for commanding an injection of a main fuel shot via each respective fuel injector 20 at a desired time during an initial engine cycle, and at least one subsequent engine cycle, or until engine 10 reaches an idle condition. In one contemplated embodiment, electronic controller 40 may determine that engine 10 has reached an idle condition marking an end to the start up mode based on a determined engine temperature and/or a determined engine speed each being above a predetermined threshold.

The means for operating engine 10 in the start-up mode may further include means for commanding injection of at least two fuel pre-shots prior to the main shot wherein a last of the at least two fuel pre-shots is larger in quantity than a first of the at least two fuel pre-shots. In one contemplated embodiment, as start-up of engine 10 progresses, in one or more engine cycles following an initial engine cycle, or any engine cycle wherein the start-up control logic of the present disclosure is activated, the control algorithm of electronic controller 40 may vary at least one of a number and individual quantity and/or average quantity of the fuel pre-shots according to determined engine temperature and determined engine speed.

INDUSTRIAL APPLICABILITY

Figure 2:
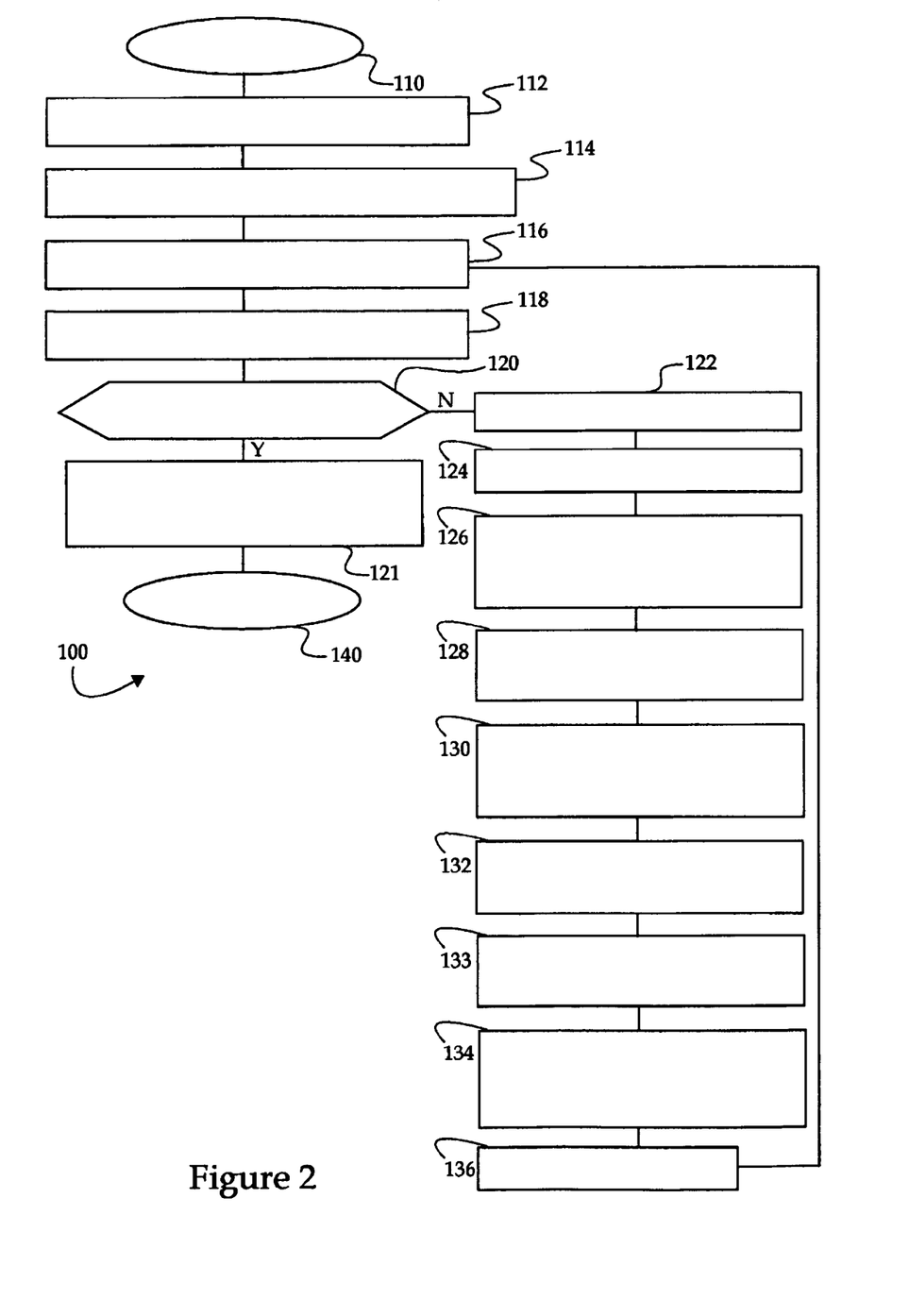
FIG. 2 illustrates a control process according to one embodiment of the present disclosure.

Turning to FIG. 2, there is shown an exemplary engine control process according to the present disclosure by way of a flowchart 100. The process of flowchart 100 begins at a START, Box 110, and proceeds to Box 112 wherein operation of engine 10 is initiated. Engine operation may be initiated in a conventional manner such as by turning an ignition key or activation of an ignition switch by an operator. From Box 112 the process may proceed to Box 114 wherein initialization or activation of the start-up control logic of the present disclosure may take place. From Box 114 the process may proceed to Box 116 wherein electronic controller 40 may determine engine speed or any value indicative thereof, for example via sensor 60. From Box 116 the process may proceed to Box 118 wherein electronic controller 40 may determine an engine temperature, for example an engine coolant temperature via sensor 50.

From Box 118, the process may proceed to Box 120 wherein electronic controller 40 will query whether engine 10 is at an idle condition. As described herein, the "idle" condition of engine 10 may be an arbitrary state, selected for example as indicative of a condition where operation via the start-up mode is no longer necessary. In certain instances, for example, where engine 10 remains warm from earlier operation, or where ambient temperatures are relatively higher, engine 10 may be determined to be at an idle condition relatively soon after initiating operation. Under such circumstances, operation via the start-up control logic described herein may be unnecessary, and operation may proceed via a conventional control scheme immediately or almost immediately, upon initiating operation. Thus, where at Box 120 engine is found to be at idle, the process may proceed directly to Box 121 wherein the start-up control logic is deactivated, and thenceforth to Box 140, a FINISH.

Where, however, engine 10 is not determined at Box 120 to be at an idle, the process may proceed to Box 122 wherein electronic controller 40 may determine a pre-shot fueling quantity. Pre-shot fueling may be determined, for instance, via at least one map including coolant temperature and engine speed coordinates. Once pre-shot fueling is determined at Box 122, the process may proceed to Box 124 wherein electronic controller 40 may select an appropriate cold mode shot count map. Electronic controller 40 may, for example, select from among a plurality of cold mode shot count maps based on determined engine speed and determined engine coolant temperature, as well as a fueling limit and possibly other conditions known in the art. The fueling limit input during the step of Box 124 may be determined based on a crank fueling limit and a power management system in a well-known manner. Those skilled in the art will appreciate that the crank fueling limit provides a total fuel injection quantity limit per an engine cycle, for example. Electronic controller 40 may determine a total number of fuel shots at Box 122, for example, at least two fuel pre-shots and a main shot.

From Box 124, the process may proceed to Box 126 wherein electronic controller 40 may determine a number of pre-shots via the selected shot count map and a pre-shot limit map. The pre-shot limit map, where used, will allow electronic controller 40 to determine a maximum number of allowable pre-shots based on work machine battery voltage and engine speed, for example. In some instances, the work machine battery may not be capable of providing sufficient electrical power, simply because its charge is already too low or because engine speed is too low, to power the number of pre-shots determined to be desired as per the cold mode shot count map. In such instances, the pre-shot limit map may serve to reduce the number of pre-shots to what the system is capable of providing. Thus, the pre-shot limit map may be thought of as a means for limiting the number of pre-shots to that which the system can provide, even where a larger number of pre-shots may be called for via the shot count map. A shot count overspeed protection step may also take place at Box 126 wherein electronic controller 40 may ensure fuel injected in the main shot is not of sufficient quantity to overspeed the engine. Thus, in Box 126 a total number of fuel injection shots will be determined.

From Box 126 the process may proceed to Box 128 wherein electronic controller 40 may determine an appropriate fuel pre-shot slope, which may also be mapped to determined engine temperature and determined engine speed. As described herein, the fuel pre-shot slope may be used to adjust a quantity of one or more of the fuel pre-shots from an initially mapped quantity. From Box 128 the process may proceed to Box 130 wherein electronic controller 40 may determine the individual fuel pre-shot quantities via the appropriate fuel pre-shot slope.

From Box 130 the process may proceed to Box 132 wherein electronic controller 40 may determine the intake manifold pressure, for example, via intake manifold pressure sensor 70. From Box 132, the process may proceed to Box 133 wherein electronic controller 40 may determine an appropriate pre-shot electronic dwell, for instance, via at least one map having a determined engine temperature coordinate, a determined engine speed coordinate and an intake manifold pressure coordinate. In one contemplated embodiment, electronic controller 40 may utilize three maps, each corresponding to different intake manifold pressure ranges, for instance, a 100 kPa map, a 75 kPa map and a 50 kPa map.

From Box 133 the process may proceed to Box 134 wherein electronic controller 40 may command injection of the fuel pre-shots, typically prior to autoignition conditions in the respective cylinder. From Box 134, the process may proceed to Box 136 wherein electronic controller 40 may command injection of the main fuel shot. The main fuel shot may be a governed main shot, which may vary based on the crank fueling limit. Whereas the fuel pre-shots will each have quantities determined via the maps described herein, the main shot may be actively controlled via a governor and limited based on the fuel offset provided by the fuel pre-shots.

From Box 136 the process may return to Box 116 wherein electronic controller 40 may again determine the engine speed, thenceforth to Box 118 wherein electronic controller will again determine the engine coolant temperature. The process will then proceed to Box 120 wherein electronic controller 40 will once again query whether engine 10 has reached idle conditions or such other conditions as are appropriate for deactivation of the start-up control logic, which may take place in Box 121 before the process proceeds to the FINISH at Box 140, otherwise the process repeats itself for a subsequent engine cycle.

It should be appreciated that the aforementioned process steps need not be carried out in a particular order, and are not necessarily all required. Accordingly, the present disclosure should not be limited to the exact sequence or content of the operations described herein. For example, while the process of flowchart 100 illustrates the determination of pre-shot fueling, Box 122, as taking place just prior to selecting an appropriate cold mode shot count map, the cold mode shot count map might instead be selected prior to the pre-shot fueling determination. Thus, those skilled in the art will appreciate that certain of the process steps described above might be carried out in parallel, or in a different order, without departing from the scope of the present disclosure.

Figure 3:
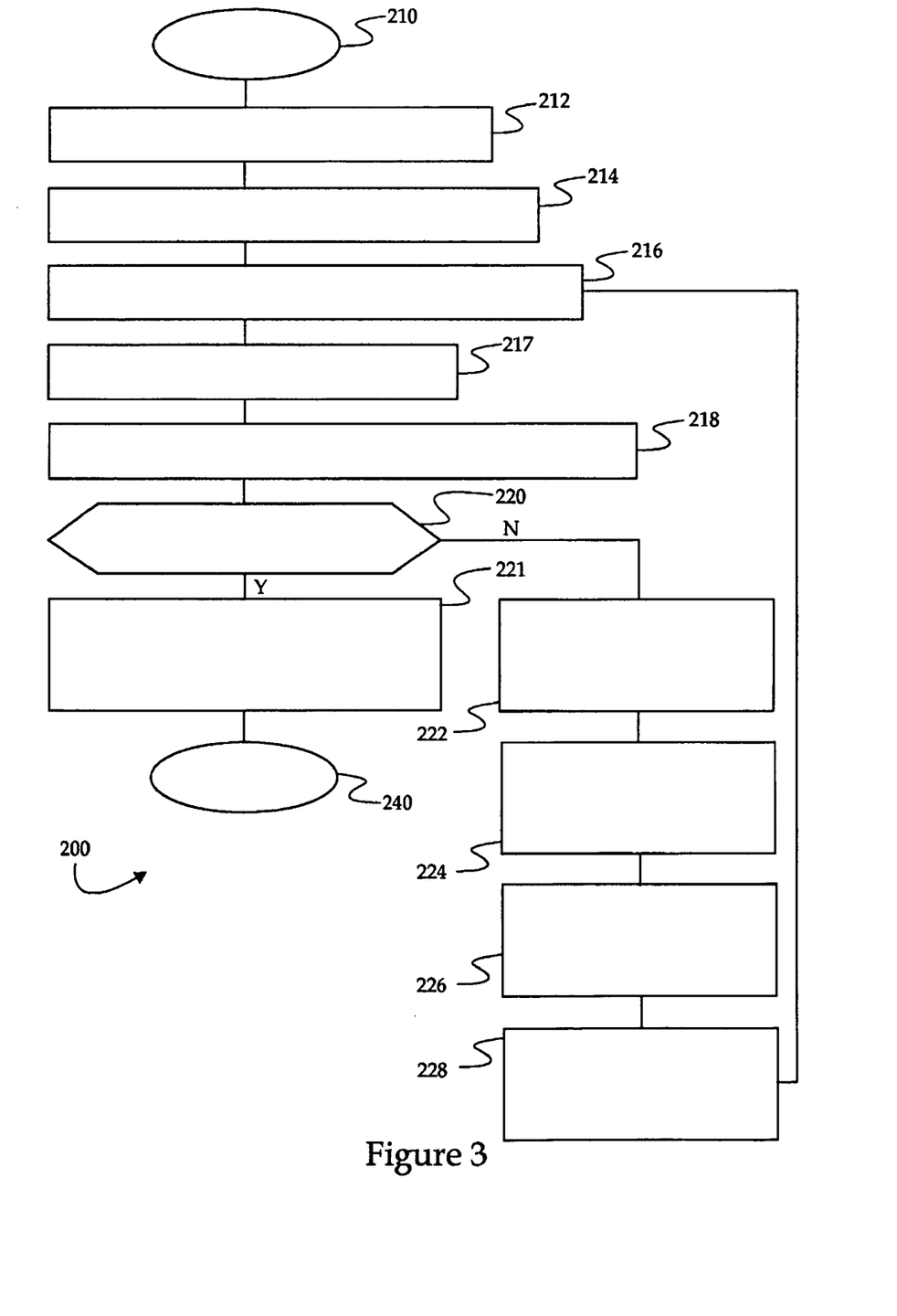
FIG. 3 illustrates a control process according to another embodiment of the present disclosure.

Turning now to FIG. 3, there is shown another exemplary control process illustrated via a flowchart 200, in accordance with the present disclosure. The process of flowchart 200 will begin at a START, Box 210, and will then proceed to Box 212 wherein initiation of engine operation will take place. From Box 212, the process may proceed to Box 214 wherein initialization/activation of the engine start-up control logic may take place. From Box 216, the process may proceed to Box 217 wherein electronic controller 40 may determine an intake manifold pressure, for example via pressure sensor 70. From Box 217, the process may proceed to Box 218 wherein electronic controller 40 may determine engine speed, for example, via sensor 60. From Box 218, the process may proceed to Box 219 wherein electronic controller 40 may determine the engine coolant temperature. From Box 218, the process may proceed to Box 220 wherein electronic controller 40 may query whether engine 10 is at an idle condition or other stable state. If yes, the process may proceed to Box 221 wherein electronic controller 40 may deactivate the start-up control logic, and thenceforth to a FINISH, Box 240.

If engine 10 is not at an idle at Box 220, the process may proceed to Box 222 wherein electronic controller 40 may select a cold mode start of injection pressure (SOI P) map. The SOI P map may include, for instance, a map having a crank fueling coordinate, an engine speed coordinate and an engine coolant temperature coordinate. A plurality of maps may be made available, for example, five maps corresponding to five engine temperature ranges, such as a −32° C. map, a −18° C. map, a −9° C. map, a 0° C. map and a 25° C. map. Once the appropriate map is selected at Box 222, the process may proceed to Box 224 wherein electronic controller 40 may adjust the pressure in common rail 36, for example, by adjusting the speed and/or displacement of high pressure pump 34. The target rail pressure may be determined based also in part on a SOI P multiplier, for instance, an SOI P multiplier that is a function of determined intake manifold pressure and determined coolant temperature. In general terms, SOI P will be generally lower where determined engine temperature is lower and will be increased as the engine warms and speeds up.

From Box 224, the process may proceed to Box 226 wherein electronic controller 40 may determine the number, timing and spacing of the fuel pre-shots. The respective number, timing and spacing of the fuel pre-shots may be determined via any suitable means, for example, the means described hereinabove. From Box 226, the process may proceed to Box 228 wherein electronic controller 40 may command injection of the fuel pre-shots and the main shot. From Box 228, the process may return to Box 216 wherein electronic controller 40 may again determine the intake manifold pressure. From Box 216, the process may proceed again through the steps of Boxes 217–220 and once again determine whether engine 10 is at idle. The start-up control logic may be deactivated in Box 221, and the process concluded at Box 240.

Figure 4:
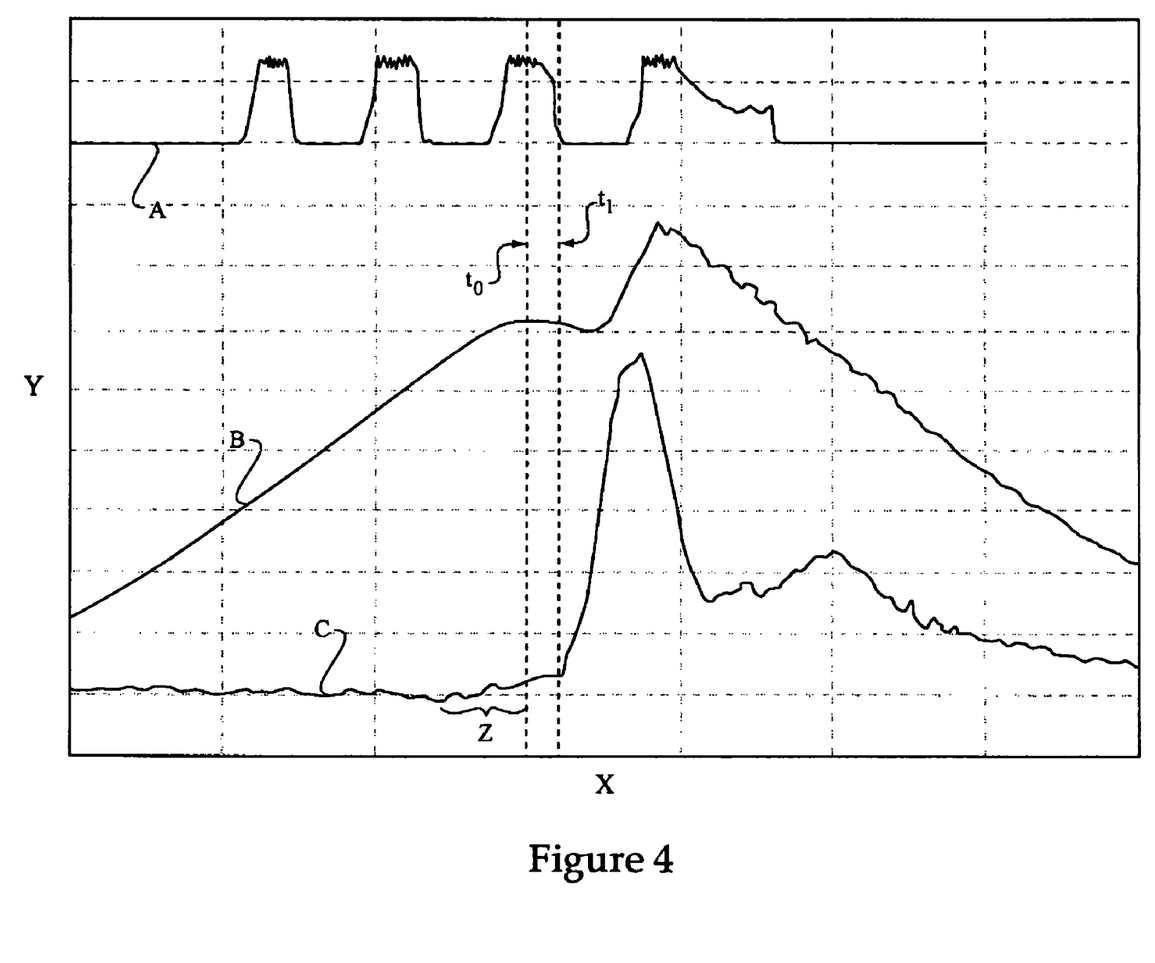
FIG. 4 is a graph illustrating a fuel injection sequence along with apparent cylinder heat release and cylinder pressure over time according to the present disclosure.

Turning to FIG. 4, there is shown a graph illustrating apparent heat release, cylinder pressure and a fuel injection sequence in a cylinder of engine 10 during a portion of an exemplary engine cycle during initial operation according to the present disclosure. The X axis represents crank angle (or time) in engine 10, with $t_0$ corresponding to a top dead center position, or "zero" crank angle, of a piston of the subject cylinder. The Y axis represents a quantity coordinate for each of the parameters of interest, in a conventional fashion. Line "A" represents a signal value corresponding to fuel injection commands sent from electronic controller 40, or could represent injection quantities from, to a fuel injector 20. Each rise in line A represents a fuel injection, with the first three such rises representing fuel pre-shots and the last representing a main shot. The fuel pre-shots represented in FIG. 4 successively increase in quantity. Line "B" represents cylinder pressure during the portion of the engine cycle shown. As is apparent from FIG. 4, cylinder pressure increases in a generally parabolic fashion as the crank angle approaches $t_0$. Line "C" represents apparent heat release in the subject cylinder.

It may also be noted from FIG. 4 that there is evidence of heat release during the injection of the third pre-shot, line segment "Z". Had the first two pre-shots not been present, a fuel injection event at this location by itself might have quenched, in which case the evidence of heat release during the third pre-shot would not exist. Thus, it may be concluded that the first two pre-shots activated a condition in the cylinder allowing some measurable energy release from the third shot, which may lead to a successful ignition of the main, or final shot. In general, each of the fuel pre-shots is believed to result in an activated condition in the cylinder which may be sustained until the immediately subsequent pre-shot is injected, beginning another pre-ignition initiation of fuel oxidation. It will typically be desirable to inject a sufficient quantity of fuel in each pre-shot such that an activated condition in the cylinder will be sustained until the next pre-shot is injected. It is important, however, that the fuel pre-shot quantity will not be so large that it causes quenching. By the time the third pre-shot is completely injected, in the case of the FIG. 4 example, just after $t_0$, a sufficiently activated condition exists in the cylinder to support an initiation of a more conventional diffusion burn, evident at approximately $t_1$ where the apparent heat release begins to increase rather abruptly.

The relatively low heat capacity of colder, less dense air is believed to limit the fuel quantities that may be injected. Thus, where engine temperature, and thus in-cylinder temperatures are relatively colder, the capacity of the cylinder to support the "activated" condition without quenching as described herein may be relatively lower for a given amount of fuel at a given crank angle. In other words, the amount of fuel that may be injected in a fuel pre-shot and induce an activated condition in the cylinder without quenching will be relatively lower where cylinder temperatures are relatively lower. As the cylinder pressure and hence, temperature, increases as the piston approaches top dead center in a compression stroke, the amount of fuel which may be injected in a pre-shot without quenching will increase. This is believed to be due at least in part to the air having a higher pressure as it is compressed during the piston compression stroke. Thus, each of the fuel pre-shots may be understood as having a quantity determined according to a quenching limit of the cylinder charge air, at a given crank angle. The pre-shot quantities may be a maximum quantity that can be injected without causing quenching, but need not be.

The present disclosure thus offers a way to maximize the amount of pre-shot fueling, successively increasing the quantity of each pre-shot as the capacity of the cylinder charge air to accommodate the pre-shot fuel without quenching increases. Accordingly, the present disclosure can provide enhanced cold starting as compared to certain earlier approaches, which relied upon pre-shots all of identical quantity. In earlier approaches, the size of the individual pre-shots would in many cases be limited to a maximum size of the first pre-shot, ultimately unduly limiting the total amount of fuel to be injected in the pre-shots. By recognizing the capacity of an engine to accommodate increasingly large pre-shots without quenching, the present disclosure allows the total quantity of pre-shot fuel to be increased over earlier designs, and improving cold starting without increasing the risk of quenching. Thus, the present disclosure can result in quicker starting and less time in a start up mode during cold starts.

The present description is for illustrative purposes only, and should not be construed to narrow the breadth of the present disclosure in any fashion. Thus, those skilled in the art will appreciate that various modifications might be made to the presently disclosed embodiments without departing from the intended scope and spirit of the present disclosure. Other aspects, features and advantages will be apparent upon an examination of the attached drawing Figures and appended claims.

What is claimed is:

1. A method of initially operating an internal combustion engine comprising the steps of:

initiating operation of the internal combustion engine, including operating the engine in a start-up mode that includes injecting a main shot and at least two fuel pre-shots into at least one cylinder of the engine during an engine cycle, wherein a first pre-shot is smaller in quantity than a last pre-shot;

wherein the step of initiating operation further comprises the steps of:

pressurizing a fuel to a start of injection pressure in a common rail of the internal combustion engine;

determining a total fuel pre-shot injection quantity;

determining a number of fuel pre-shots; and apportioning the total fuel pre-shot injection quantity among the at least two fuel pre-shots via a fuel pre-shot quantity slope mapped to engine temperature and engine speed;

the method further comprising the steps of:

determining an intake manifold pressure;

determining an engine temperature;

determining an engine speed; and concluding operation in the start-up mode;

wherein the step of initiating operation further comprises the step of pressurizing the fuel to a start of injection pressure in the common rail that is based on the determined intake manifold pressure and the determined engine temperature; and wherein the step of initiating operation further comprises injecting a first of the at least two fuel pre-shots at a predetermined crank angle of the internal combustion engine that is based at least in part on at least one of the determined engine speed and the determined engine temperature.

2. An internal combustion engine comprising:

a housing defining at least one cylinder;

a fuel injector disposed at least partially within the at least one cylinder;

an electronic controller in control communication with said fuel injector, said electronic controller including a computer readable medium having a control algorithm recorded thereon including means for operating said engine in a start-up mode prior to reaching an idle condition, said means for operating including means for commanding injection of a main shot and at least two fuel pre-shots during an engine cycle including a first fuel pre-shot and a last fuel pre-shot larger in quantity than said first fuel pre-shot.

3. An article comprising:

a computer readable medium having an internal combustion engine start-up control algorithm recorded thereon, said control algorithm including means for commanding injection of a main shot and at least two fuel pre-shots in an engine cycle including a first pre-shot and a last pre-shot larger in quantity than said first pre-shot, and means for varying at least one of a number and average quantity of said fuel pre-shots in at least one subsequent engine cycle according to a determined engine temperature and determined engine speed, wherein said control algorithm further includes means for deactivating after an engine controlled thereby reaches an idle condition.

4. The article of claim 3 wherein said control algorithm further includes means for varying a fuel pre-shot quantity slope over a plurality of engine cycles responsively to changes in engine temperature and engine speed.

5. A method of initially operating an internal combustion engine comprising the steps of:
 initiating operation of the internal combustion engine, including operating the engine in a start-up mode prior to reaching an idle condition that includes injecting a main shot and at least two fuel pre-shots into at least one cylinder of the engine during an engine cycle, wherein a first pre-shot is smaller in quantity than a last pre-shot; and
 concluding operation in the start-up mode after the engine reaches an idle condition.

6. The method of claim 5 wherein the step of initiating operation includes injecting the at least two fuel pre-shots during an initial engine cycle.

7. The method of claim 5 wherein the step of initiating operation further comprises the steps of:
 pressurizing a fuel to a start of injection pressure in a common rail of the internal combustion engine; and
 determining a total fuel pre-shot injection quantity;
 determining a number of fuel pre-shots; and
 apportioning the total fuel pre-shot injection quantity among the at least two fuel pre-shots via a fuel pre-shot quantity slope mapped to engine temperature and engine speed.

8. The method of claim 5 wherein the step of initiating operation comprises injecting at least two fuel pre-shots having quantities based at least in part on a quenching limit of the internal combustion engine.

9. An internal combustion engine comprising:
 a housing defining at least one cylinder;
 a fuel injector disposed at least partially within the at least one cylinder;
 an electronic controller in control communication with said fuel injector, said electronic controller including a computer readable medium having a control algorithm recorded thereon including means for operating said engine in a start-up mode, said means for operating including means for commanding injection of a main shot and at least two fuel pre-shots during an engine cycle including a first fuel pre-shot and a last fuel pre-shot larger in quantity than said first fuel pre-shot;
 said engine further comprises means for determining an engine temperature and means for determining an engine speed; and
 said means for operating said engine in the start-up mode includes means for commanding injection of said at least two fuel pre-shots each having a predetermined quantity based at least in part on engine temperature and engine speed.

10. The internal combustion engine of claim 9 wherein said control algorithm further includes means for determining a fuel pre-shot quantity slope via at least one map.

11. The internal combustion engine of claim 10 wherein said means for operating said engine in the start-up mode comprises means for commanding injection of at least three fuel pre-shots where the determined engine speed and determined engine temperature are each below a predetermined threshold.

12. The internal combustion engine of claim 11 wherein said control algorithm further includes means for concluding operation of the start-up mode after the occurrence of a predetermined engine speed and/or predetermined engine temperature.

13. A method of initially operating an internal combustion engine comprising the steps of:
 initiating operation of the internal combustion engine, including operating the engine in a start-up mode that includes injecting a main shot and at least two fuel pre-shots into at least one cylinder of the engine during an initial engine cycle, wherein a first pre-shot is smaller in quantity than a last pre-shot;
 determining an engine temperature, wherein the step of initiating operation comprises injecting at least two fuel pre-shots, having respective quantities based at least in part on the determined engine temperature; and
 concluding operation in the start-up mode.

14. The method of claim 13 further comprising the step of determining an engine speed, wherein the step of initiating operation further comprises injecting at least two fuel pre-shots, having respective quantities based at least in part on determined engine temperature and determined engine speed.

15. The method of claim 14 further comprising the steps of:
 determining an intake manifold pressure; and
 determining a time between the pre-shots based at least in part on the determined intake manifold pressure, determined engine temperature and determined engine speed.

16. The method of claim 14 further comprising the step of determining a fuel pre-shot quantity slope, wherein the step of initiating operation further comprising injecting at least two fuel pre-shots according to the fuel pre-shot quantity slope.

17. The method of claim 16 wherein:
 the step of determining the fuel pre-shot quantity slope comprises determining a linear slope based at least in part on determined engine temperature and determined engine speed; and
 the step of initiating operation comprises injecting at least three fuel pre-shots successively increasing in quantity, if the determined engine temperature is below a predetermined threshold.

18. The method of claim 14 wherein the step of initiating operation comprises injecting at least three fuel pre-shots, if the determined engine temperature is below a predetermined threshold in the initial engine cycle.

19. The method of claim 18 wherein the step of initiating operation further comprises injecting at least three fuel pre-shots, if the determined engine temperature is below a predetermined threshold and the determined engine speed is below another predetermined threshold in an engine cycle subsequent to the initial engine cycle.

20. The method of claim 19 further comprising the step of, reducing at least one of fuel pre-shot quantity and pre-shot number where at least one of determined engine speed and determined engine temperature increases over a plurality of engine cycles subsequent to the initial engine cycle.

* * * * *